July 16, 1935. L. J. IRELAND Re. 19,646

APPARATUS FOR RECLAIMING USED AND DILUTED LUBRICATING OIL

Original Filed Sept. 21, 1931 2 Sheets-Sheet 1

Lewis J. Ireland
INVENTOR

BY Ernest A. Hood

ATTORNEY

July 16, 1935. L. J. IRELAND Re. 19,646
APPARATUS FOR RECLAIMING USED AND DILUTED LUBRICATING OIL
Original Filed Sept. 21, 1931 2 Sheets-Sheet 2
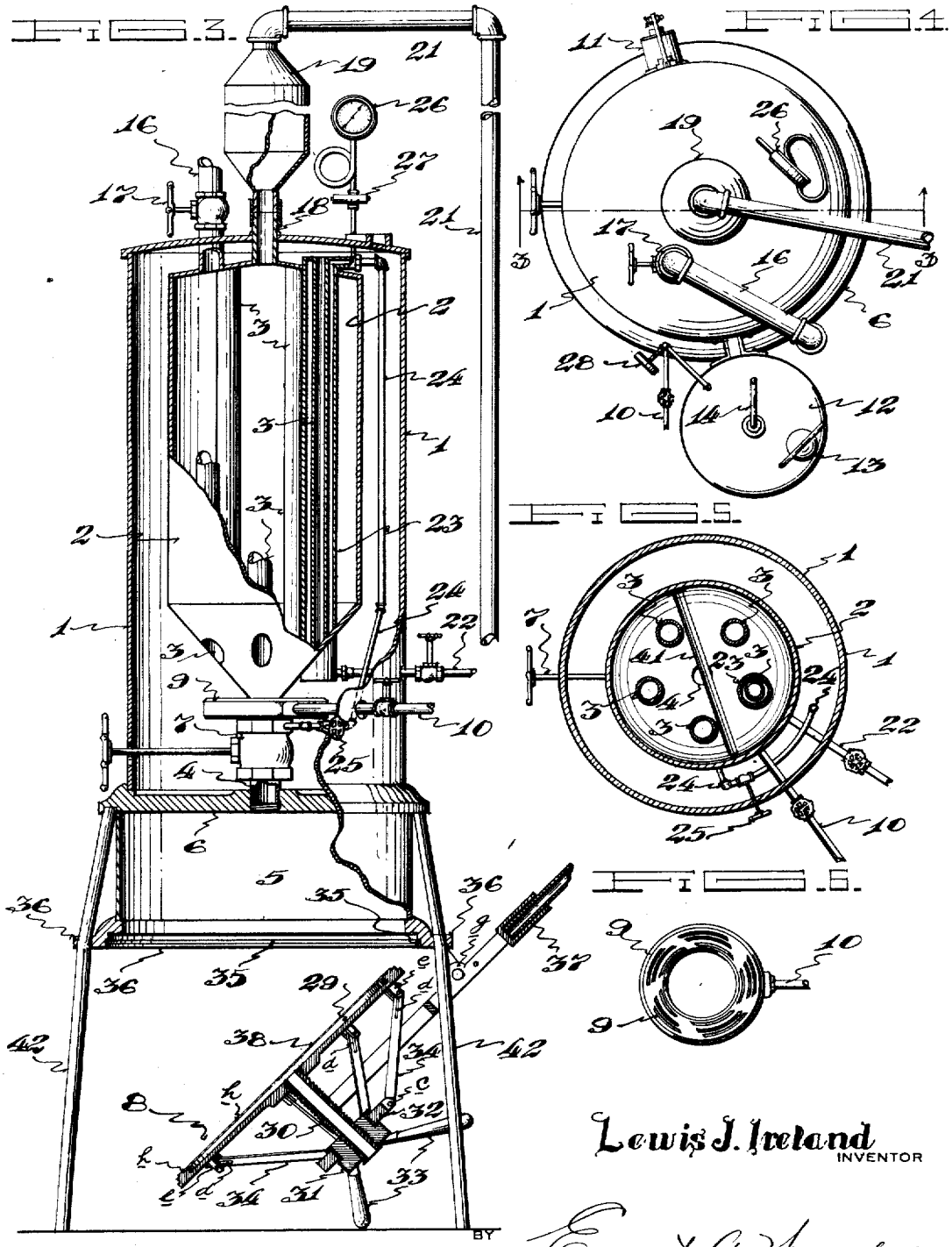
Lewis J. Ireland
INVENTOR
Ernest A. Hood
ATTORNEY Reissued July 16, 1935

Re. 19,646

UNITED STATES PATENT OFFICE 19,646

APPARATUS FOR RECLAIMING USED AND DILUTED LUBRICATING OIL

Lewis J. Ireland, Austin, Tex., assignor, by direct and mesne assignments, to Triploil Manufacturing Company, Wilmington, Del., a corporation of Delaware Original No. 1,852,350, dated April 5, 1932, Serial No. 563,998, September 21, 1931. Application for reissue filed November 14, 1932, Serial No. 642,688

7 Claims. (Cl. 196—16)

This invention relates to an apparatus for reclaiming or reconditioning used crank case oils and it has particular reference to an apparatus for carrying out the process covered by applicant's co-pending application, filed August 25, 1930, and bearing Serial No. 477,532, for rejuvenating lubricating oils which have become diluted and temporarily impaired through constant use and so impregnated with foreign substances, such as dust, particles of metal, or the like as to render them useless for further lubricating purposes.

The principal object of the invention resides in the combination of certain elements whereby such used and worn out oils may be subjected to a certain treating process without the use of acids or other harmful chemicals yet producing an improved lubricant from water diluted and carbon impregnated oils which would otherwise be useless for the purpose of lubrication.

Another object of the invention is manifest in the provision of an apparatus wherein such used and worn out lubricating oils may be thoroughly divested of such abrasive substances as motor cuttings, dust and other foreign matter as well as carbon, water and such gasoline and kerosene as might find their way into the crank case of motor vehicles.

Still another object of the invention resides in the provision of a device of the character described capable of receiving such impaired lubricating oils, completely restoring the same to its original specification, without the aid of any other equipment or treating apparatus and provide a means whereby many thousands of gallons of used lubricants removed from motor vehicles each day can be renewed, which would otherwise be destroyed.

Broadly, the invention seeks to comprehend an apparatus whereby a super refining process may be accomplished since it is capable of removing certain harmful acids and chemicals, and the like, from cheap grades of lubricating as well as used lubricants, thereby producing a high quality lubricant by removing the undesirable properties therefrom.

While the foregoing objects are paramount, the invention has particular reference to its salient features of construction and arrangement of parts which will become manifest as the description proceeds taken in connection with the accompanying drawings wherein:

Figure 3 is a cross sectional view of the invention taken on lines 3—3 of Figure 4, showing portions cut away to illustrate the inner jacket.

Figure 4 is a plan view of the invention.

Figure 5 is a horizontal cross section of the invention taken on lines 5—5, of Figure 1, and Figure 6 is a plan view of the burner or heating unit.

Figure 1:
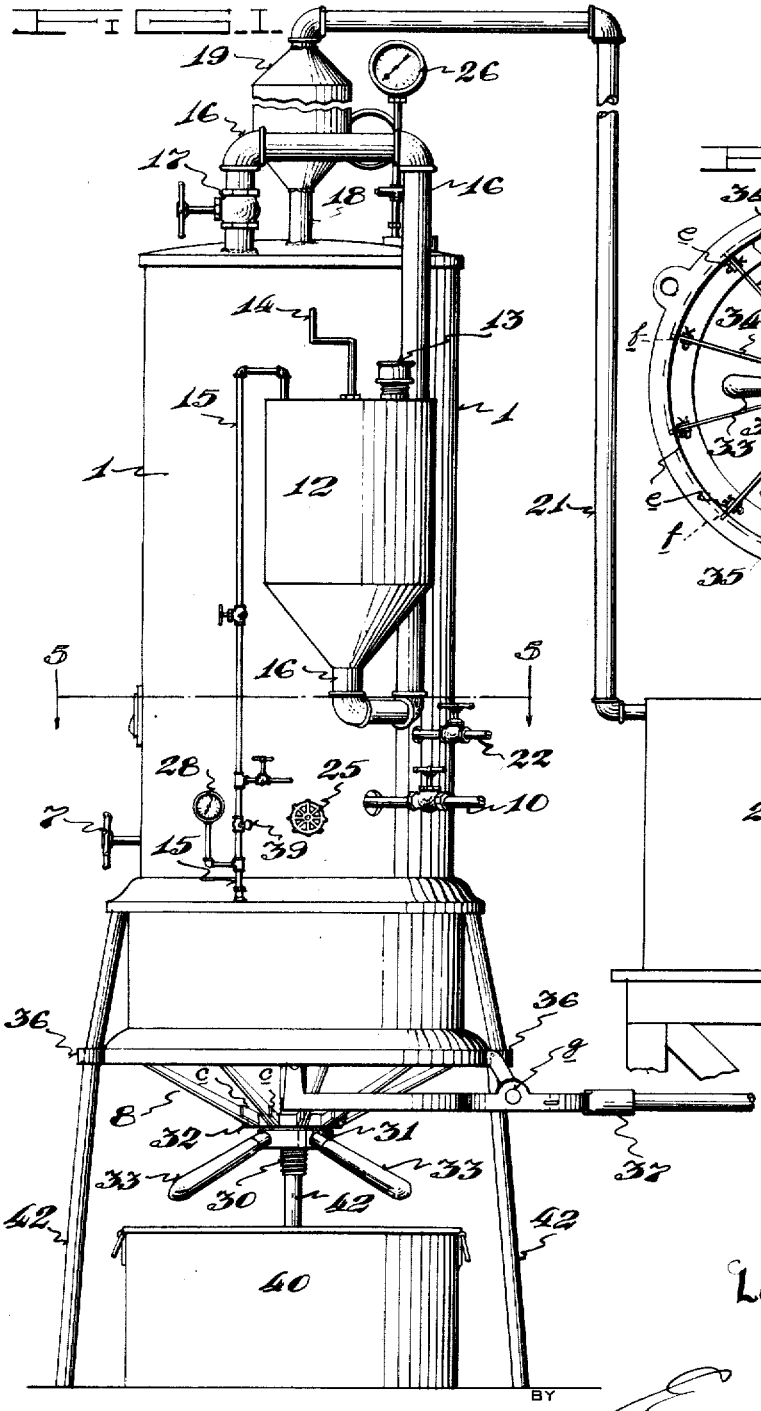
Figure 1 is an elevational view of the invention showing the condenser with base thereof cut away.
Figure 2:
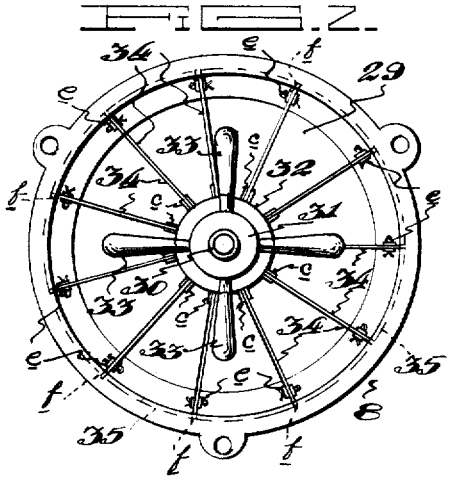
Figure 2 is an inverted plan view of the invention showing the novel arrangement of toggle links and threaded locking means for the filter bottom.

It has been discovered by persons versed in the art of lubrication, that although highly improved methods are used in refining petroleum for lubricating purposes, certain undesirable properties remain in such lubricants which should be removed. It is found, also, that lubricating oil, after being subjected to the severe treatment which it receives in internal combustion motors, certain highly volatile constituents are taken out, leaving the rich, main body of the lubricant which, after having had the other undesirable properties such as water, carbon and abrasive foreign substances, removed will possess greater viscosity and increased lubricating qualities. In other words it is the purpose of this invention not only to completely restore used and worn out motor oil, removing the diluents therefrom, but to produce a higher grade of lubricant than that which has not been subjected to the severe refining process such as that which it receives in an internal combustion motor for the reason that the weaker molecules are broken down and taken out.

Accordingly, 1 represents a cylindrical outer casing within which is situated, in concentrical relationship therewith, a smaller cylindrical chamber 2 having a substantially cone shaped lower portion, as shown in Figure 3.

Running vertically through the chamber 2 are flues 3 which communicate with the space in the outer casing 1 above the chamber 2 and around its conical bottom which latter is connected, at its extreme lower end, to a passage 4 communicating with a filtering chamber 5 which is separated from the outer casing 1 by a plate 6 thereby providing an air tight compartment in the filter chamber when the valve 7 is closed and the closure 8, at the bottom of the filter chamber 5, is locked. The closure 8 will be more fully described presently.

By further reference to Figure 3, it will be noted that a gas or oil burner 9 is provided to heat the chamber 2. This member 9 is arranged around the extreme lower end of the conical bottom of the chamber 2 where the latter joins the passage 4 into the filter chamber 5 and it is supplied with fuel through a pipe 10 the volume being regulated by a thermostatic control 14, shown in Figure 4. The burner 9 is illustrated in Figure 6.

As previously pointed out, the purpose of the invention being to carry out a certain process for rejuvenating used crank case oils, it is necessary that this process be here described in order that a more comprehensive description of the present invention may be had.

After the petroleum has been placed in the loading chamber 12 through the filler opening 13, a predetermined quantity of acid treated clay is introduced therein whereupon the oil and the clay is thoroughly mixed by the agitator 14 which can be operated by a crank extending through the top of the loading chamber 12, as illustrated in Figures 1 and 4.

When the oil and clay have been thoroughly mixed, and the cap on the filler opening 13 has been threaded down tight to render the chamber 12 air tight, air pressure is introduced through a pipe 15 into the chamber 12 forcing the mixture of oil and clay up through the pipe 16 and into the chamber 2, the latter being shown more clearly in Figure 3, whereupon the valve 17 is closed to prevent the passage of vapors therethrough.

Upon the introduction of the mixture into the chamber 2, heat is applied to the conical bottom of the latter by the burner 9 and by reason of the flues 3, will pass entirely through the chamber 2 to heat the oil which completely surrounds the flues 3. Obviously, the maximum of heating surface is provided by the use of the conical bottom of the chamber 2 and the flues 3 extending through said chamber 2, as illustrated in Figure 3.

As the temperature of the oil increases, it is agitated by the introduction of steam therethrough to more completely mix the clay with the oil and to drive off the vaporized undesirable light volatiles through the vent 18 and the expending chamber 19, thence to the condenser 20, through a pipe 21, where they are drawn off in liquid form.

The steam is provided by the introduction of water through a pipe 22 into a jacket 23 surrounding one of the flues 3 which latter, due to the passage of heat therethrough, vaporizes the water and transforms it into steam which passes up through the jacket 23 into a pipe 24 connected at its upper end and down through the latter which communicates at its lower end, with the passage 4 just below the burner 9, the volume of steam being regulated by a valve 25. This arrangement is fullly illustrated in Figure 3.

A gauge 26 is provided at the top of the invention to indicate the steam pressure in the jacket 23 and a pop valve 27 is regulated to release the pressure when it reaches a certain point. A gauge 28 is also provided to communicate with the air line 15 to indicate the air pressure therethrough.

Referring now to the closure 8 at the bottom of the filter chamber 5, it is pointed out that the plate 29 has an aperture through its center (a) into which is threaded a pipe 30 which latter is threaded its entire length. A round casting 31, having an annular groove (b) around its outer periphery capable of receiving a collar 32, is threaded upon the pipe 30, as shown in Figures 1 and 3. The casting 31 can be threaded up and down the pipe 30 by means of hand grips 33.

The collar 32 is provided with ears (c) cast integral therewith into which are hinged toggle links 34 which extend radially outward from the collar 32 to the outer edge of the plate 29 where their outer ends are slotted at (d) to receive a pin whereby they are hinged to lugs (e) around the plate 29. At the extreme outer end of the toggle links 34 a projection (f) is provided which extends into an annular groove 35 around the inner periphery of the circular frame casting 35 into which the plate 29 seats itself when closed. The entire assembly just described is hinged at (g) to the frame casting 36 and is counter balanced by a weight or handle 37, as indicated in Figures 1 and 3.

When the oil has been heated to a sufficient degree and all of the vapors have been driven off, one or more layers of paper or similar material is placed upon a perforated disk 38, which latter is arranged in a recess in the plate 29, whereupon the assembly is seated into the frame casting 36 and the casting 31 is threaded upward. As the casting 31 is urged upward, the outer ends f of the toggle links 34 engage the annular groove 35 in the frame casting 36, locking the assembly to provide a seal and render the filter chamber 5 capable of holding the oil.

After this is accomplished, the valve 7 is opened allowing the oil and clay mixture to pass out of the chamber 2 into the filter chamber 5 by gravity through the passage 4, whereupon, the valve 7 is again closed and another mixture is introduced into the chamber 2 through the loading chamber 12 as before.

Due to the complete seal in the filter chamber 5, by reason of the locked closure 8 and valve 7, a vacuum is created and since the oil must filter through the layers of paper and the perforated plate 38, a certain pressure is introduced into the filter chamber 5, therefore, through the pipe 15 which enters the chamber 5 through the plate 6, as shown in Figure 1, and which is regulated.

When pressure is applied to the oil and clay mixture in the filter chamber 5, the oil, which is heated to approximately 453° F. is forced through the clay and paper into the recess (h) where it will pass out through the threaded pipe 30 into a receptacle 40.

After the oil has been filtered through the perforated plate 38 and the layers of paper the closure 8 is again dropped down and the paper, bearing the clay, is removed, fresh paper is applied for a second operation as before.

A thermometer well 41 into which a thermometer may be inserted is fixed to the wall of the chamber 2 and extends into the latter as illustrated in Figure 5. This device is in the form of a tube, closed at its free end, and is completely surrounded by the oil which assures a correct registration of the temperature.

As apparent in Figures 1 and 3, the entire structure is supported by legs 42.

Although the invention has been described with great particularity, it is understood that it is not intended that the same shall be limited to specific arrangement and construction of parts and that certain changes and modifications may be resorted to from time to time as may fall within the scope and meaning of the appended claims.

What is claimed is:

1. In a device for renewing used petroleum lubricants, an outer casing, an inner casing having a series of flues vertically arranged therein, means for introducing petroleum lubricants into said inner casing, means to apply heat to said inner casing to boil the petroleum lubricants, means within said inner casing to produce steam, means to introduce said steam in said inner casing to agitate petroleum lubricants, and means adjacent the top of said inner casing to carry off the vapors from lubricants.

2. An apparatus for removing undesirable diluents from used lubricating oils including a heating chamber having a multiplicity of flues therethrough, means for introducing clay laden lubricating oils into said heating chamber and means to apply heat thereto, a steam producing element arranged within said heating chamber, means to carry said steam into said heating chamber and upward through said oil to agitate the same, and means to carry off said steam and other vapors from said heating chamber.

3. An apparatus for reclaiming used lubricants comprising an inner and outer casing, a multiplicity of vertical passages through said inner casing, means for introducing a mixture of oil and clay into said inner casing, and means to apply heat thereto, a steam producing element situated within said inner casing, means to carry said steam from said steam producing element through said oil in said inner casing, and means to carry said steam and other vapors out of said inner casing.

4. A device for removing undesirable diluents, and the like, from used crank case oils comprising an encased heating chamber having passages therethrough, means to introduce said oils into said heating chamber and means to apply heat thereto, a steam producing element arranged within said heating chamber, and means to cause said steam to pass through said oil in said heating chamber to carry off the vapors from said oil.

5. In an apparatus for restoring used motor oils comprising an encased heating chamber having a series of vertical passages therethrough, means for introducing motor oils into said heating chamber and means to apply heat thereto, a steam jacket arranged around one of the said passages for producing steam, means for carrying said steam into the base of said heating chamber and through said oil to carry off the vapors therefrom, and means to allow the escape of said vapors.

6. An apparatus for removing undesirable diluents from used lubricating oils, comprising, in combination, a heating chamber for receiving lubricating oils and clay therein, means for externally heating said chamber, a steam producing element arranged within said heating chamber, in heat interchanging relationship with respect to the oil, means for conveying the steam thus produced to the lower portion of said chamber to thereby agitate the oil in the passage of the steam upwardly through the body of oil and maintain the clay particles in a state of suspension and means to carry off said steam and other vapors from said heating chamber.

7. An apparatus for reclaiming used lubricating oil comprising an outer casing, container means for admixed lubricating oil and clay within and spaced from the casing, flues extending through a substantial portion of the container means, burner means in the outer casing, said flues being open to the outer casing whereby combustion gases generated by the burner means flow therethrough, a gas outlet for removing the combustion gases from the outer casing, a steam producing element arranged to be heated by combustion gases in transit from the burner means to said outlet, and means for conveying steam from said element into the lower portion of the container means.

LEWIS J. IRELAND.